Figure 1:
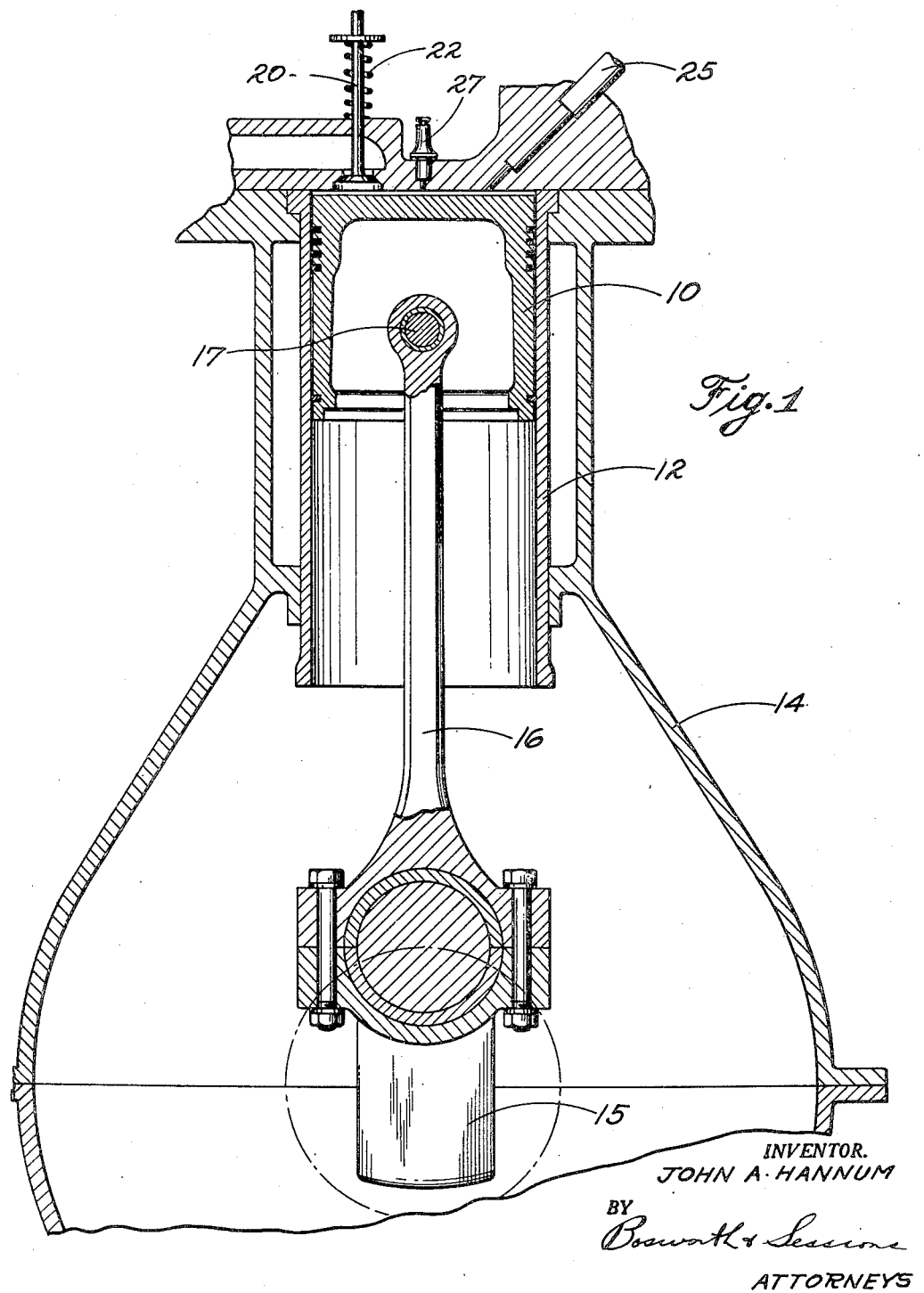

INVENTOR.
JOHN A. HANNUM

BY Bosworth & Sessions
ATTORNEYS

Patented Mar. 7, 1950

2,499,642

UNITED STATES PATENT OFFICE 2,499,642

METHOD OF OPERATING INTERNAL-COMBUSTION ENGINES

John A. Hannum, Detroit, Mich., assignor, by mesne assignments, to Borg-Warner Corporation, Chicago, Ill., a corporation of Illinois Application September 13, 1945, Serial No. 616,027

3 Claims. (Cl. 123—1)

This invention relates to a reciprocating internal combustion engine and more particularly to an improved method or cycle of operation by which such an engine may be driven through a work stroke.

Internal combustion engines of the reciprocating type, while well known and widely used, are subject to important factors that limit their working efficiency and impose restrictions that affect their design. These factors partly are due to the nature of the work cycle of the engine and to the mechanical limitations that must be met in its design. The nature of the fuel and the source of oxygen for its combustion also govern the design of the engine and its performance. In the majority of cases free oxygen from the surrounding atmosphere has been used to burn the fuel. In certain engines of the type indicated the oxygen for fuel combustion has been supplied in other than gaseous form and taken from other sources than the surrounding atmosphere. However, insofar as I am aware such engines have met with little or no success. These engines are exemplified by the so-called gunpowder engines.

As to internal combustion engines, those that operate on the two-stroke cycle as distinguished from the four-stroke cycle provide smoother power production, partly because in a given time interval there are twice as many explosions to provide a power impulse. Engines of this type that operate on the diesel cycle also are relatively more efficient due to the degree to which the fuel is atomized in the injection device.

However such engines are subject to marked disadvantages. They do not readily exhaust or scavenge the products of combustion because the exhaust port must be closed a substantial interval before the piston reaches top dead center if the air for combustion during the next cycle is to be compressed in the cylinder. On the other hand if the port is kept open longer and the air, as a gas, is charged into the cylinder at or near top dead center it must be done at a considerable pressure and into a combustion space of appreciable volume. Not only does this require extra devices to attain and handle the requisite pressures but the degree to which scavenging takes place then is directly related to the combustion space provided at top dead center.

With the present invention I contemplate the use of a two-stroke cycle engine that is not subject to the above disadvantages and also possesses the advantages heretofore known, as well as important advantages heretofore not known, in engines of this type. This is accomplished by a working cycle attained through use of a single fluid propellant that may be vaporized to a gas at the time of combustion. By single fluid I mean a propellant entity formed of a single liquid chemical entity, a liquid (as distinguished from gaseous) solution or a dispersion in a liquid of another liquid, or normally solid constituent, to result in an essentially fluid whole, stable under ordinary conditions of temperature and pressure.

This single liquid will be self sufficient in the sense that all, or a part of, the oxygen for combustion will be incorporated therein in a combined form. No constituents that are gaseous at normal temperatures or pressures are ingredients. This mixture preferably is so proportioned that the liquid charged into the cylinder provides the materials needed for complete combustion at the time of ignition. It will preferably consist of a fuel and a source of oxygen in combined form mixed in proportions in accord with their reaction formula. It is injected just after the piston passes top dead center and into a combustion space of negligible volume.

The pressure is the combustion space in such circumstances is somewhat less than that at which exhaust took place. During injection and until ignition the pressure constantly is decreased in the combustion space due to its enlargement by the down stroke of the piston. An engine operated in accord with the above conception possesses important advantages over both the Otto and Diesel types. It obtains the high efficiencies that are only reached in the latter with high compression ratios and it accomplishes this without the necessity of using any compression at all. Hence the power losses due to the compression stroke are eliminated entirely.

It is the general object of the present invention to provide an internal combustion engine system that employs a single-liquid propellant as defined above. A further object of the invention is to provide an engine in which the combined oxygen and the fuel are in a mixed state prior to the time of injection into the cylinder. Another object of the invention is to provide a system in which the fuel is injected into the cylinder at a pressure below that of the surrounding atmosphere and is thereafter ignited without being subjected to any pressure increase. Still another object of the invention is to provide for smoother power production by use of a two-stroke cycle with an operating efficiency comparable to or greater than that obtained with the high compression ratios possible in four-stroke cycle engines. An additional object of the invention is to employ a negligible volume of combustion space between the cylinder and piston and thus permit more complete scavenging of the exhaust gases than was heretofore possible. A still further object of the invention is to eliminate the necessity for requiring that the engine give up a part of its energy in compressing air during a compression stroke.

Other objects of the invention will become apparent from the specification when studied with reference to the attached drawings. The novel and only limiting features of the invention are summarized in the claims.

In the attached drawings there are shown in schematic form successive operating positions of a piston in an engine operating in accordance with this invention. Figure 1 illustrates in some detail the position of the moving parts at the beginning of the down stroke, namely, movement of the piston toward the crank shaft. Figures 2, 3, 4, 5 and 6 show schematically the successive positions assumed by the piston during an operating cycle.

In general the invention may be incorporated in various types of reciprocating piston mechanisms. It is not essential that any prescribed construction be employed as long as the engine is capable of operation in accordance with the disclosed method. The construction shown is by way of illustration only and the invention is not limited to this design. This will become apparent as the description proceeds.

Referring particularly to Figure 1, a piston 10 is mounted for reciprocation in a cylinder 12 that is integral with or secured to a crank case 14. In the crank case is a crank shaft 15 connected by a suitable connecting rod 16 to a wrist pin 17 of the piston 10. One or more piston-cylinder combinations may be used with an engine embodying the present invention and the cylinders may be arranged in line or positioned radially about a crank shaft axis. The disclosure of the invention is applied to a conventional connecting rod piston type of prime mover as a matter of preference only. Various types of prime movers operable as a result of the reciprocation of a piston in a cylinder are considered to be within the scope of this invention.

At the head of the cylinder are mounted an igniter, an exhaust port and a fuel injection atomizer. The exhaust port is indicated generally at 20 and preferably is of the well known poppet valve construction which normally is held closed by a coil spring 22 and is opened by a cam of suitable configuration. The parts of such a valve mechanism are conventional and for this reason are not described in further detail. Their construction will be apparent to one skilled in the art, as will the construction of alternative valve mechanisms that give the same end result.

The fuel injection atomizer is only generally indicated at 25 because the construction of such a device is well known as it is used to supply fuel to Diesel engines. One of the several such types of an injection atomizer is modified to handle a propellant having the viscosity and other characteristics of the fuel to be used as will be understood by one skilled in the art. In like manner an igniter is provided as indicated at 27 to establish combustion at the proper time. This igniter may be of conventional and well known construction.

From the description thus far it will be seen that an engine operating in accordance with the present invention may be constructed from known components modified to operate as herein disclosed. It also will be seen that the preferred form of construction indicated and the preferred form of the components to be used may be altered as required.

A complete cycle of operation contemplates a 360° rotation of the crank shaft 15 causing one complete down stroke (toward the crank shaft) and one complete up stroke of the piston. The beginning of the operating cycle is shown in Fig. 1. During this first step of operation the piston has begun to move down until the rotating crank shaft is approximately 1° or 2° past its top dead center. It is at this point in the operating cycle that the exhaust valve closes. The engine is now in condition to have the propellant injected into the cylinder 12 at the top of the piston. Top dead center and bottom dead center are defined respectively as the positions of the piston where the volume of combustion space is at a minimum and maximum respectively.

Figure 2:
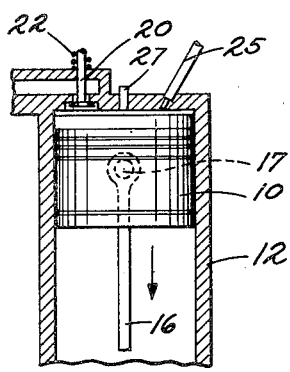

The second step in the operable cycle during which the propellant is injected through the injection atomizer 25 is shown in Fig. 2. The piston is now continuing to move down and has attained a position approximately 3° to 5° past top dead center. It will be seen that the pressure within the cylinder on top of the piston has been reduced because up to this time the volume of this space has been increased without the addition of gaseous material. Into this partial vacuum the propellant is injected. Due to the fact that there is no compression stroke with the present system and the further fact that there is a partial vacuum in the cylinder when the piston is in this position the injection pressure may be relatively low. It is very considerably lower than the injection pressure of an engine in which a compression stroke is employed. In a sense the partial vacuum in the cylinder can, by a sucking action, aid in drawing the requisite amount of fuel into the engine. While the piston is in approximately this position, namely 3° to 5° past top dead center, the injection valve closes.

Figure 3:
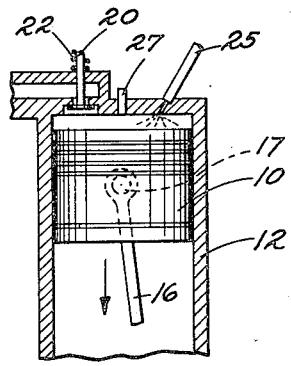

The third step in the operation of the present system is illustrated in Fig. 3 and is the position in which the fuel is ignited. The piston has now moved on down somewhat, a few degrees, beyond the preceding position. Ignition is accomplished through activating the igniter 27 which is preferably an electrical device to create a spark within the cylinder at the desired time. The preferred position for ignition is when the piston is approximately 6° past top dead center.

The explosion of the propellant mixture due to its ignition drives the piston on down to complete the down stroke. This is the power stroke. Due to the fact that the propellant is self-sufficient for combustion purposes it need not be first mixed with air and can be supplied to the injector as a single liquid in accordance with the definition given above.

Figure 4:
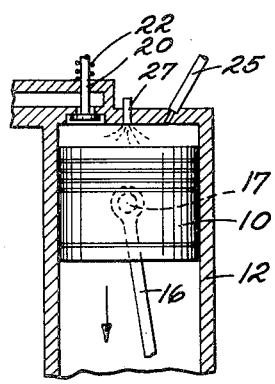

The fourth step in the cycle of operation is shown in Fig. 4 and preferably takes place just prior to the time the piston reaches bottom dead center. This is the opening of the exhaust valve and should occur not more than 5° ahead of bottom dead center and not later than bottom dead center. The reason for this lies in the fact that the closer to bottom dead center the exhaust valve opens the more useful work will be done by the gases that have been formed in the cylinder and are expanding under pressure. On the other hand as soon as the piston passes bottom dead center it begins to move upwardly through its exhaust or return stroke and unless the exhaust valve is open, compression of these same gases begins to take place. One of the features of the present invention is a system in which no compression stroke is required. The only resistance offered to the up or return movement of the piston by gases in the cylinder arises due to the restrictive action of the valve port.

Figure 5:
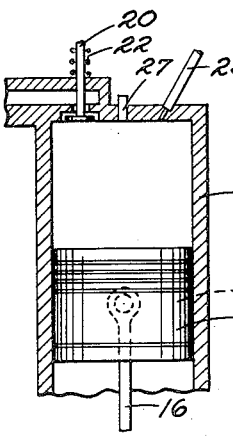
Figure 6:
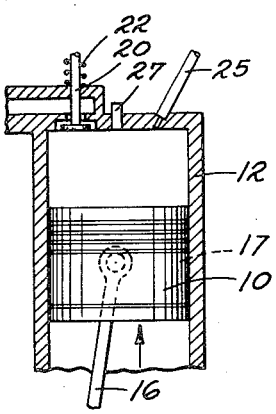

Figure 5 illustrates the fifth and final step in the cycle of operation and is a condition that prevails during the entire up stroke of the piston to top dead center. As the piston moves up it forces the gases that are the products of the earlier combustion (during the third step) out of the cylinder through the open exhaust port. There is no compression applied during any up stroke of the piston.

At the time the piston reaches top dead center it will have completed one entire cycle of operation and as it passes top dead center will begin to move away from the cylinder head. At this time the conditions described in connection with Fig. 1 will prevail and the first operating step will repeat itself to start the next cycle just described. This cycle is, of course, repeated countless times during the operation of the engine.

The clearance necessary at the end of the fifth step of operation and before the first step, namely as the piston passes top dead center, may be negligible. The fact that no compression stroke is required and that the exhaust valve is open until top dead center has been passed means that no accommodation need be provided in this engine for any compressed gases at this stage of the cycle. Thus the only clearance required as the piston passes top dead center is that required by mechanical considerations of design.

From the foregoing description, in which a preferred mechanism has been described to accomplish the invention, it will be seen that I have provided a novel operating cycle for an internal combustion engine: it is intended that the patent shall cover, by suitable expression in the appended claims, whatever features of patentable novelty reside therein.

I claim:

1. In a two-stroke reciprocating internal combustion engine accomplishing substantially complete scavenging of the products of combustion, the method of operating the piston to achieve negligible clearance between the cylinder and the end of the piston at the conclusion of the return stroke comprising the steps of injecting a liquid propellant comprising fuel and combined oxygen sufficient to effect its combustion into the cylinder by means of a fuel injection atomizer while the pressure in the cylinder is less than that of the surrounding atmosphere and the piston is from 3 to 5 degrees past top dead center, closing the means for ingress of said propellant to the cylinder, and thereafter, in the absence of additional oxygen from the surrounding atmosphere, igniting said propellant when the piston is approximately 6 degrees past top dead center to drive the piston through its power stroke; commencing to exhaust the products of combustion from the cylinder through a port at the top thereof after ignition but before the piston reaches bottom dead center; continuing to exhaust the products of combustion throughout the up stroke of the piston, meanwhile progressively reducing the untraveled distance between the cylinder and the end of the piston until such distance is of negligible extent; and, without providing a compression stage, closing the exhaust port approximately 2 degrees after the piston passes top dead center.

2. In a two-stroke reciprocating internal combustion engine accomplishing substantially complete scavenging of the products of combustion, the method of operating the piston to achieve negligible clearance between the cylinder and the end of the piston at the conclusion of the return stroke comprising the steps of injecting a liquid propellant comprising fuel and combined oxygen sufficient to effect its combustion into the cylinder by means of a fuel injection atomizer while the pressure in the cylinder is less than that of the surrounding atmosphere, closing the means for ingress of said propellant to the cylinder, and thereafter, in the absence of additional oxygen from the surrounding atmosphere, igniting said propellant to drive the piston through its power stroke; commencing to exhaust the products of combustion from the cylinder through a port at the top thereof after ignition but before the piston reaches bottom dead center; continuing to exhaust the products of combustion throughout substantially the entire up stroke of the piston, meanwhile progressively reducing the untraveled distance between the cylinder and the end of the piston until such distance is of negligible extent; and, without providing a compression stage, closing the exhaust port approximately when the piston passes top dead center.

3. In a two-stroke reciprocating internal combustion engine accomplishing substantially complete scavenging of the products of combustion, the method of operating the piston to achieve negligible clearance between the cylinder and the end of the piston at the conclusion of the return stroke comprising the steps of injecting a liquid propellant comprising fuel and combined oxygen sufficient to effect its combustion into the cylinder by means of a fuel injection atomizer, closing the means for ingress of said propellant to said cylinder, and thereafter, in the absence of additional oxygen from the surrounding atmosphere, igniting said propellant to drive the piston through its power stroke; commencing to exhaust the products of combustion from the cylinder after ignition but before the piston reaches the end of the power stroke; continuing to exhaust the products of combustion throughout the entire return stroke of the piston, meanwhile progressively reducing the untraveled distance between the cylinder and the end of the piston until such distance is of negligible extent; closing the exhaust port when the piston passes the end of the return stroke; and, without providing a compression stage, repeating cycle.

JOHN A. HANNUM.

REFERENCES CITED

The following references are of record in the file of this patent:

UNITED STATES PATENTS

| Number | Name | Date |
| --- | --- | --- |
| 651,741 | Anderson | June 12, 1900 |
| 651,742 | Anderson | June 12, 1900 |
| 961,966 | Jahnke | June 21, 1910 |
| 1,167,376 | Bouteille | Jan. 11, 1916 |
| 1,305,579 | Wolfard | June 3, 1919 |
| 1,872,931 | Goldsborough | Aug. 23, 1932 |
| 1,901,709 | Erren | Mar. 14, 1944 |